United States Patent
Black et al.

(10) Patent No.: US 11,820,361 B2
(45) Date of Patent: Nov. 21, 2023

(54) TRANSMISSION ASSEMBLY WITH ELECTRICAL MACHINE UNIT FOR IMPROVED SHIFT QUALITY

(71) Applicant: Deere & Company, Moline, IL (US)

(72) Inventors: David S. Black, Bettendorf, IA (US); Stacy K. Worley, Coffeyville, KS (US); Clayton G. Janasek, Independence, MO (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/538,691

(22) Filed: Nov. 30, 2021

(65) Prior Publication Data
US 2023/0166718 A1    Jun. 1, 2023

(51) Int. Cl.
*B60W 20/30* (2016.01)
*B60W 10/101* (2012.01)
(Continued)

(52) U.S. Cl.
CPC ............... *B60W 20/30* (2013.01); *B60K 6/26* (2013.01); *B60K 6/543* (2013.01); *B60W 10/02* (2013.01);
(Continued)

(58) Field of Classification Search
CPC ...... B60W 20/30; B60W 10/02; B60W 10/08; B60W 10/101; B60W 2510/10;
(Continued)

(56) References Cited

U.S. PATENT DOCUMENTS

| | | |
|---|---|---|
| 3,214,987 A | 11/1965 | Schenck et al. |
| 3,626,787 A | 12/1971 | Singer |

(Continued)

FOREIGN PATENT DOCUMENTS

| | | |
|---|---|---|
| AT | 11545 U1 | 12/2010 |
| CN | 101255907 A | 9/2008 |

(Continued)

OTHER PUBLICATIONS

Schmetz, Roland, Electromechanische Traktorgetriebe Getriebe mit Zukunft, Electromechanical Tractor Units—Gearboxes with a Future, Landtechnik, Agricultural Engineering, vol. 54; Issue 2; pp. 72-73, Feb. 1999.

(Continued)

*Primary Examiner* — Tisha D Lewis
(74) *Attorney, Agent, or Firm* — Klintworth & Rozenblat IP LLP

(57) ABSTRACT

A transmission assembly for a work vehicle having an engine includes a variator operably connected to the engine, a gear arrangement configured to provide a selective gear reduction for transmission of output power from the variator to an output shaft, and an electrical machine unit. The electrical machine unit further includes a main shaft operably connected to the variator, a first rotor configured to rotatably drive a first shaft, a second rotor configured to rotatably drive a second shaft, and a clutch configured to selectively couple the first shaft or the second shaft, or both the first shaft and the second shaft, to the main shaft. The clutch, the first rotor, and the second rotor are operable to control a speed and rotational direction of the main shaft in providing rotational power to the variator.

16 Claims, 5 Drawing Sheets

(51) Int. Cl.
| | |
|---|---|
| *B60K 6/543* | (2007.10) |
| *B60K 6/26* | (2007.10) |
| *H02K 16/02* | (2006.01) |
| *B60W 10/02* | (2006.01) |
| *B60W 10/08* | (2006.01) |
| *H02K 7/00* | (2006.01) |
| *H02K 7/108* | (2006.01) |
| *H02K 7/116* | (2006.01) |
| *B60K 6/44* | (2007.10) |
| *E02F 9/20* | (2006.01) |

(52) U.S. Cl.
CPC .......... *B60W 10/08* (2013.01); *B60W 10/101* (2013.01); *H02K 7/006* (2013.01); *H02K 7/108* (2013.01); *H02K 7/116* (2013.01); *H02K 16/02* (2013.01); *B60K 6/44* (2013.01); *B60W 2510/10* (2013.01); *B60W 2710/021* (2013.01); *B60W 2710/08* (2013.01); *B60W 2710/10* (2013.01); *B60Y 2200/41* (2013.01); *B60Y 2200/92* (2013.01); *B60Y 2400/60* (2013.01); *E02F 9/202* (2013.01); *E02F 9/2075* (2013.01)

(58) Field of Classification Search
CPC ....... B60W 2710/021; B60W 2710/08; B60W 2710/10; B60K 6/26; B60K 6/543; B60K 6/44; H02K 7/006; H02K 7/108; H02K 7/116; H02K 16/02; B60Y 2200/41; B60Y 2200/92; B60Y 2400/60; E02F 9/202; E02F 9/2075
See application file for complete search history.

(56) References Cited

U.S. PATENT DOCUMENTS

| | | | |
|---|---|---|---|
| 3,651,904 A | 3/1972 | Snoy | |
| 3,714,845 A | 2/1973 | Mooney, Jr. | |
| 3,783,711 A | 1/1974 | Orshansky, Jr. | |
| 4,090,414 A | 5/1978 | White | |
| 4,164,155 A | 8/1979 | Reed et al. | |
| 4,164,156 A | 8/1979 | Reed | |
| 5,156,577 A | 10/1992 | Fredriksen et al. | |
| 5,277,286 A | 1/1994 | Yamamoto et al. | |
| 5,353,662 A | 10/1994 | Vaughters | |
| 5,508,574 A | 4/1996 | Vlock | |
| 5,611,245 A | 3/1997 | McKee | |
| 5,931,757 A | 8/1999 | Schmidt | |
| 6,254,509 B1 | 7/2001 | Meyer | |
| 6,394,925 B1 | 5/2002 | Wontner et al. | |
| 6,478,705 B1 | 11/2002 | Holmes et al. | |
| 6,641,505 B2 | 11/2003 | Sayman et al. | |
| 6,684,148 B2 | 1/2004 | Chess | |
| 7,008,342 B2 | 3/2006 | Dyck et al. | |
| 7,252,611 B2 | 8/2007 | Raghavan et al. | |
| 7,294,079 B2 | 11/2007 | Raghavan et al. | |
| 7,311,627 B2 | 12/2007 | Tarasinski | |
| 7,329,201 B2 | 2/2008 | Raghavan et al. | |
| 7,367,911 B2 | 5/2008 | Raghavan et al. | |
| 7,377,876 B2 | 5/2008 | Yang | |
| 7,399,246 B2 | 7/2008 | Holmes et al. | |
| 7,465,251 B2 | 12/2008 | Zhang | |
| 7,473,201 B2 | 1/2009 | Raghavan et al. | |
| 7,479,081 B2 | 1/2009 | Holmes | |
| 7,491,144 B2 | 2/2009 | Conlon | |
| 7,611,433 B2 | 11/2009 | Forsyth | |
| 7,901,314 B2 | 3/2011 | Salvaire et al. | |
| 7,942,776 B2 | 5/2011 | Conlon | |
| 8,234,956 B2 | 8/2012 | Love et al. | |
| 8,257,213 B2 | 9/2012 | Komada et al. | |
| 8,439,787 B2 | 5/2013 | Salamandra et al. | |
| 8,469,127 B2 | 6/2013 | Tarasinski et al. | |
| 8,500,585 B2 | 8/2013 | Kim et al. | |
| 8,573,340 B2 | 11/2013 | Tarasinski et al. | |
| 8,579,751 B2 | 11/2013 | Phillips | |
| 8,596,157 B2 | 12/2013 | Vu | |
| 8,660,724 B2 | 2/2014 | Tarasinski et al. | |
| 8,672,069 B2 | 3/2014 | Cherney et al. | |
| 8,734,281 B2 | 5/2014 | Ai et al. | |
| 8,747,266 B2 | 6/2014 | Aitzetmueller et al. | |
| 8,784,246 B2 | 7/2014 | Treichel et al. | |
| 8,790,202 B2 | 7/2014 | Sakai et al. | |
| 8,944,194 B2 | 2/2015 | Glaser et al. | |
| 8,986,162 B2 | 3/2015 | Dix et al. | |
| 9,002,560 B2 | 4/2015 | Hasegawa | |
| 9,097,342 B2 | 8/2015 | Dix et al. | |
| 9,206,885 B2 | 12/2015 | Rekow et al. | |
| 9,487,073 B2 | 11/2016 | Love et al. | |
| 9,562,592 B2 | 2/2017 | Rekow et al. | |
| 9,840,165 B2 | 12/2017 | Cox | |
| 9,840,827 B2 | 12/2017 | Miyamoto et al. | |
| 9,944,163 B2 | 4/2018 | McKinzie | |
| 9,981,665 B2 | 5/2018 | Rekow et al. | |
| 10,029,694 B2 | 7/2018 | Sharp et al. | |
| 10,119,598 B2 | 11/2018 | Rekow et al. | |
| 10,619,711 B2 * | 4/2020 | Fliearman | B60K 6/445 |
| 10,647,193 B2 | 5/2020 | McKinzie et al. | |
| 10,655,710 B2 | 5/2020 | Rekow et al. | |
| 10,670,124 B2 | 6/2020 | Rekow et al. | |
| 10,738,868 B2 | 8/2020 | McKinzie et al. | |
| 10,975,959 B2 | 4/2021 | McKinzie et al. | |
| 11,052,747 B2 | 7/2021 | Ore | |
| 11,091,018 B2 | 8/2021 | Ore et al. | |
| 11,137,052 B2 | 10/2021 | Ore et al. | |
| 11,413,960 B2 | 8/2022 | Bindl et al. | |
| 11,535,234 B2 | 12/2022 | Duffy et al. | |
| 11,572,672 B2 | 2/2023 | Vilar et al. | |
| 11,628,822 B2 * | 4/2023 | McKinzie | B60W 10/08 701/22 |
| 2001/0016536 A1 | 8/2001 | Minowa et al. | |
| 2003/0186769 A1 | 10/2003 | Ai et al. | |
| 2004/0094381 A1 | 5/2004 | Versteyhe | |
| 2004/0172184 A1 | 9/2004 | Vukovich et al. | |
| 2005/0036894 A1 | 2/2005 | Oguri | |
| 2005/0049100 A1 | 3/2005 | Ai et al. | |
| 2006/0046886 A1 | 3/2006 | Holmes et al. | |
| 2006/0111212 A9 | 5/2006 | Ai et al. | |
| 2006/0142104 A1 | 6/2006 | Saller | |
| 2006/0276291 A1 | 12/2006 | Fabry et al. | |
| 2007/0021256 A1 | 1/2007 | Klemen et al. | |
| 2007/0021257 A1 | 1/2007 | Klemen et al. | |
| 2007/0249455 A1 | 10/2007 | Hasegawa et al. | |
| 2008/0171626 A1 | 7/2008 | Pollman | |
| 2009/0250278 A1 * | 10/2009 | Kawasaki | B60K 6/543 903/910 |
| 2010/0048338 A1 | 2/2010 | Si | |
| 2010/0179009 A1 | 7/2010 | Wittkopp et al. | |
| 2010/0261565 A1 | 10/2010 | Ai et al. | |
| 2011/0130235 A1 | 6/2011 | Phillips | |
| 2012/0157254 A1 | 6/2012 | Aitzetmueller et al. | |
| 2013/0023370 A1 | 1/2013 | Grad et al. | |
| 2013/0123055 A1 | 5/2013 | Mattsson et al. | |
| 2013/0173126 A1 | 7/2013 | Ruebsam | |
| 2013/0211655 A1 | 8/2013 | Ogata et al. | |
| 2013/0231815 A1 | 9/2013 | Tanishima et al. | |
| 2013/0325238 A1 | 12/2013 | Kato et al. | |
| 2014/0018201 A1 | 1/2014 | Tolksdorf | |
| 2014/0248986 A1 | 4/2014 | Weeramantry et al. | |
| 2014/0128196 A1 | 5/2014 | Rintoo | |
| 2014/0128217 A1 * | 5/2014 | Tabata | B60W 10/06 903/902 |
| 2014/0315685 A1 | 10/2014 | Hotter | |
| 2015/0006007 A1 | 1/2015 | Kitahata et al. | |
| 2015/0072823 A1 | 3/2015 | Rintoo | |
| 2015/0142232 A1 | 5/2015 | Tabata et al. | |
| 2015/0142282 A1 | 5/2015 | Lee et al. | |
| 2015/0183436 A1 | 7/2015 | Rekow et al. | |
| 2015/0184726 A1 | 7/2015 | Rekow et al. | |
| 2015/0292608 A1 | 10/2015 | McKinzie | |
| 2016/0090091 A1 | 3/2016 | Gugel et al. | |
| 2016/0201295 A1 | 7/2016 | Kishimoto et al. | |
| 2016/0272059 A1 | 9/2016 | Watanabe et al. | |

(56) References Cited

U.S. PATENT DOCUMENTS

| | | |
|---|---|---|
| 2017/0066447 A1 | 3/2017 | Hertel et al. |
| 2017/0102059 A1 | 4/2017 | Rekow et al. |
| 2017/0129477 A1 | 5/2017 | Ideshio et al. |
| 2017/0203646 A1 | 7/2017 | Mueller et al. |
| 2017/0284508 A1 | 10/2017 | Devreese |
| 2017/0284517 A1 | 10/2017 | Rekow et al. |
| 2017/0328453 A1 | 11/2017 | McKinzie et al. |
| 2018/0022353 A1 | 1/2018 | Thompson et al. |
| 2018/0043764 A1 | 2/2018 | McKinzie et al. |
| 2018/0056982 A1 | 3/2018 | Endo et al. |
| 2018/0149247 A1 | 5/2018 | Rekow et al. |
| 2018/0298993 A1 | 10/2018 | Fliearman et al. |
| 2018/0347416 A1 | 12/2018 | Komori et al. |
| 2019/0111773 A1 | 4/2019 | Nishikawa et al. |
| 2019/0118642 A1 | 4/2019 | Cho et al. |
| 2019/0337376 A1 | 11/2019 | Ore |
| 2019/0344654 A1 | 11/2019 | Kaltenbach et al. |
| 2019/0346036 A1 | 11/2019 | Ore et al. |
| 2019/0389298 A1 | 12/2019 | Kaltenbach et al. |
| 2020/0180347 A1 | 6/2020 | Ederer et al. |
| 2020/0309258 A1 | 10/2020 | McKinzie et al. |
| 2021/0062900 A1 | 3/2021 | Ore et al. |
| 2021/0129829 A1* | 5/2021 | McKinzie ............. B60W 10/08 |
| 2022/0111721 A1* | 4/2022 | Ore ........................ B60K 6/52 |

FOREIGN PATENT DOCUMENTS

| | | |
|---|---|---|
| CN | 102844588 A | 12/2012 |
| DE | 1173348 B | 7/1964 |
| DE | 4010919 A1 | 10/1991 |
| DE | 4131572 A1 | 3/1993 |
| DE | 19621200 A1 | 11/1997 |
| DE | 19954636 A1 | 5/2001 |
| DE | 201500200973 | 5/2001 |
| DE | 10128076 A1 | 12/2002 |
| DE | 10319252 A1 | 11/2004 |
| DE | 102006041160 A1 | 9/2008 |
| DE | 102008032320 A1 | 1/2010 |
| DE | 202009007972 U1 | 5/2010 |
| DE | 10201102210 A1 | 3/2011 |
| DE | 10201105868 | 3/2011 |
| DE | 102010026460 A1 | 3/2011 |
| DE | 102010021846 A1 | 12/2011 |
| DE | 102011102184 A1 | 7/2012 |
| DE | 112006002537 B4 | 8/2012 |
| DE | 102012216781 A1 | 3/2013 |
| DE | 102011115002 A1 | 4/2013 |
| DE | 102013200158 A1 | 7/2014 |
| DE | 102013009649 A1 | 12/2014 |
| DE | 102013220167 A1 | 4/2015 |
| DE | 202015102282 U1 | 5/2015 |
| DE | 102014225298 A1 | 7/2015 |
| DE | 102015111119 A1 | 1/2016 |
| DE | 102015215461 A1 | 2/2016 |
| DE | 102015220635 A1 | 5/2016 |
| DE | 102015205932 A1 | 10/2016 |
| DE | 112006000524 B4 | 2/2017 |
| DE | 102016116324 A1 | 3/2017 |
| DE | 102016120965 A1 | 5/2017 |
| DE | 102016204727 A1 | 9/2017 |
| DE | 102008030521 A1 | 9/2018 |
| DE | 102018108510 A1 | 10/2018 |
| DE | 102018209940 A1 | 12/2018 |
| DE | 102018212712 A1 | 1/2019 |
| DE | 102019204706 A1 | 11/2019 |
| DE | 102019205211 A1 | 11/2019 |
| DE | 102018213871 A1 | 2/2020 |
| DE | 102020003597 A1 | 9/2020 |
| DE | 102020209003 A1 | 3/2021 |
| DE | 102020211888 A1 | 5/2021 |
| DE | 102020213675 A1 | 5/2021 |
| DE | 102020215219 A1 | 6/2021 |
| EP | 01099882 A2 | 10/1991 |
| EP | 805059 A2 | 11/1997 |
| EP | 01707416 | 8/2007 |
| EP | 02855226 | 8/2007 |
| EP | 02466168 | 6/2012 |
| EP | 02466169 | 6/2012 |
| EP | 2631144 B1 | 8/2013 |
| EP | 2682531 A1 | 1/2014 |
| EP | 2832567 A1 | 2/2015 |
| JP | 6462174 B1 | 11/1997 |
| WO | 2007017975 A1 | 2/2007 |
| WO | 2008019799 A2 | 2/2008 |
| WO | 2011092643 A1 | 8/2011 |
| WO | 2012171812 A1 | 12/2012 |
| WO | 2017107848 A1 | 6/2017 |
| WO | 2021115580 A1 | 6/2021 |

OTHER PUBLICATIONS

John M. Miller, Hybrid Electric Vehicle Propulsion System Architectures of the e-CVT Type, IEEE Transactions on Power Electronics, vol. 21, No. 3, May 2006.

Jian Dong, Zuomin Dong, Curran Crawford, Review of Continuously Variable Transmission Powertrain System for Hybrid Electric Vehicles, Proceedings of the ASME 2011 International Mechanical Engineering Congress & Exposition, IMECE2011-63321, Nov. 11-17, 2011.

Deere & Company, Utility U.S. Appl. No. 16/670,210, filed Oct. 31, 2019.

Deere & Company, Utility U.S. Appl. No. 16/946,685, filed Jul. 1, 2020.

Deere & Company, Utility U.S. Appl. No. 17/066,746, filed Oct. 9, 2020.

Deere & Company, Utility U.S. Appl. No. 17/154,729, filed Jan. 21, 2021.

Deere & Company, Utility U.S. Appl. No. 17/171,856, filed Feb. 9, 2021.

CNIPA Office Action for Application No. 201510165982.4 dated Aug. 9, 2018, Serial Notice No. 2018080601675890.

German Search Report for application No. 10215206174 dated Jul. 16, 2015.

German Search Report for application No. 1020182036705 dated Dec. 20, 2018.

German Search Report for application No. 102018210616 dated Feb. 1, 2019.

German Search Report for application No. 1020182099391 dated Feb. 27, 2019.

German Search Report for application No. 1020182099405 dated Feb. 28, 2019.

German Search Report for application No. 102018212712 dated Apr. 12, 2019.

German Search Report for application No. 102019205211 dated Sep. 5, 2019.

German Search Report for application No. 102019204706 dated Dec. 17, 2019.

German Search Report for German application No. 1020202026513 dated Sep. 1, 2020.

German Search Report issued in application No. 102020213675.0 dated Mar. 17, 2021. (10 pages).

German Search Report issued in counterpart application No. 102020209003.3 dated Apr. 15, 2021 (10 pages).

German Search Report issued in counterpart application No. 102017220666.7 dated May 28, 2021. (10 pages).

Extended European Search Report issued in counterpart application No. 20205965.5 dated Jul. 28, 2021. (10 pages).

USPTO, Office Action in U.S. Appl. No. 14/249,258 dated Apr. 21, 2017.

USPTO, Office Action in U.S. Appl. No. 15/664,289 dated Dec. 13, 2018.

USPTO, Final Office Action in U.S. Appl. No. 15/971,867 dated Jun. 24, 2020.

USPTO, Final Office Action issued in U.S. Appl. No. 16/555,913 dated Apr. 20, 2021.

USPTO, Office Action in U.S. Appl. No. 14/249,258 dated Aug. 22, 2017.

(56) References Cited

OTHER PUBLICATIONS

USPTO, Office Action in U.S. Appl. No. 14/249,258 dated Oct. 17, 2016.
USPTO, Office Action in U.S. Appl. No. 14/536,097 dated Sep. 25, 2017.
USPTO, Office Action in U.S. Appl. No. 15/485,911 dated Feb. 8, 2019.
USPTO, Office Action in U.S. Appl. No. 15/628,979 dated Nov. 5, 2019.
USPTO, Office Action in U.S. Appl. No. 15/664,289 dated Jul. 26, 2018.
USPTO, Office Action in U.S. Appl. No. 15/793,522 dated Apr. 18, 2019.
USPTO, Office Action in U.S. Appl. No. 15/879,796 dated Aug. 23, 2019.
USPTO, Office Action in pending U.S. Appl. No. 15/971,867 dated Dec. 12, 2019.
USPTO, Office Action in U.S. Appl. No. 16/371,598 dated Jul. 21, 2020.
USPTO, Office Action in U.S. Appl. No. 16/555,913 dated Jan. 4, 2021.
USPTO, Office Action in U.S. Appl. No. 17/066,746 dated Oct. 26, 2021.
German Search Report issued in application No. DE102021209495.3 with translation, dated Jan. 11, 2022 (24 pages).
German Search Report issued in application No. DE102021214746.1 with translation, dated Jun. 30, 2022. (25 pages).
USPTO, Non-Final Office Action issued in U.S. Appl. No. 17/154,729 dated Jul. 15, 2022. (7 pages).
German Search Report issued in application No. DE102021212506.9 with translation, dated Jun. 20, 2022. (24 pages).
USPTO, Ex Parte Quayle Action issued in U.S. Appl. No. 17/171,856 on Oct. 11, 2022.
USPTO, Non-Final Office Action issued in U.S. Appl. No. 17/559,496 dated Aug. 31, 2022.
German Search Report issued in application number DE102022210460.9 dated May 8, 2023 (14 pages).
USPTO Non-Final Office Action issued in U.S. Appl. No. 15/971,867 dated Dec. 24, 2020.
German Search Report issued in application No. DE102022210864.7 dated Jun. 23, 2023. (12 pages).
German Search Report issued in application No. DE102022210864.7 dated Jun. 30, 2023. (14 pages).
USPTO Non-Final Office Action issued in U.S. Appl. No. 18/050,683 dated Aug. 3, 2023.
German Search Report issued in application No. DE102022210721.7 dated Jun. 1, 2023. (14 pages).

\* cited by examiner

TRANSMISSION ASSEMBLY WITH ELECTRICAL MACHINE UNIT FOR IMPROVED SHIFT QUALITY

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to powertrains for the operation of work vehicles for agricultural, forestry, construction, and other applications.

BACKGROUND OF THE DISCLOSURE

It may be useful, in a variety of work vehicles, to utilize both a traditional engine (e.g., an internal combustion engine) and at least one electrical machine (motor/generator) to provide useful power to an output member. For example, a portion of engine power may be diverted to drive a first electrical machine, which may in turn drive a second electrical machine. Power from the engine and the second electrical machine may be delivered to the output member (e.g., a vehicle axle or other output shaft) in a parallel or dual path configuration. The engine, the electrical machine(s), and the output member may be operatively connected via an infinitely variable transmission ("IVT") or continuously variable transmission ("CVT").

SUMMARY OF THE DISCLOSURE

A transmission assembly for a work vehicle having an engine includes a variator operably connected to the engine, a gear arrangement configured to provide a selective gear reduction for transmission of output power from the variator to an output shaft, and an electrical machine unit. The electrical machine unit further includes a main shaft operably connected to the variator, a first rotor configured to rotatably drive a first shaft, a second rotor configured to rotatably drive a second shaft, and a clutch configured to selectively couple the first shaft or the second shaft, or both the first shaft and the second shaft, to the main shaft. The clutch, the first rotor, and the second rotor are operable to control a speed and rotational direction of the main shaft in providing rotational power to the variator.

In another implementation, a work vehicle includes an engine and a transmission assembly, with the transmission assembly further including a variator operably connected to the engine, a gear arrangement configured to provide a selective gear reduction for transmission of output power from the variator to an output shaft, and an electrical machine unit. The electrical machine unit further includes a main shaft operably connected to the variator, a first rotor configured to rotatably drive a first shaft, a second rotor configured to rotatably drive a second shaft, and a clutch configured to selectively couple the first shaft or the second shaft, or both the first shaft and the second shaft, to the main shaft. The clutch, the first rotor, and the second rotor are operable to control a speed and rotational direction of the main shaft in providing rotational power to the variator.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
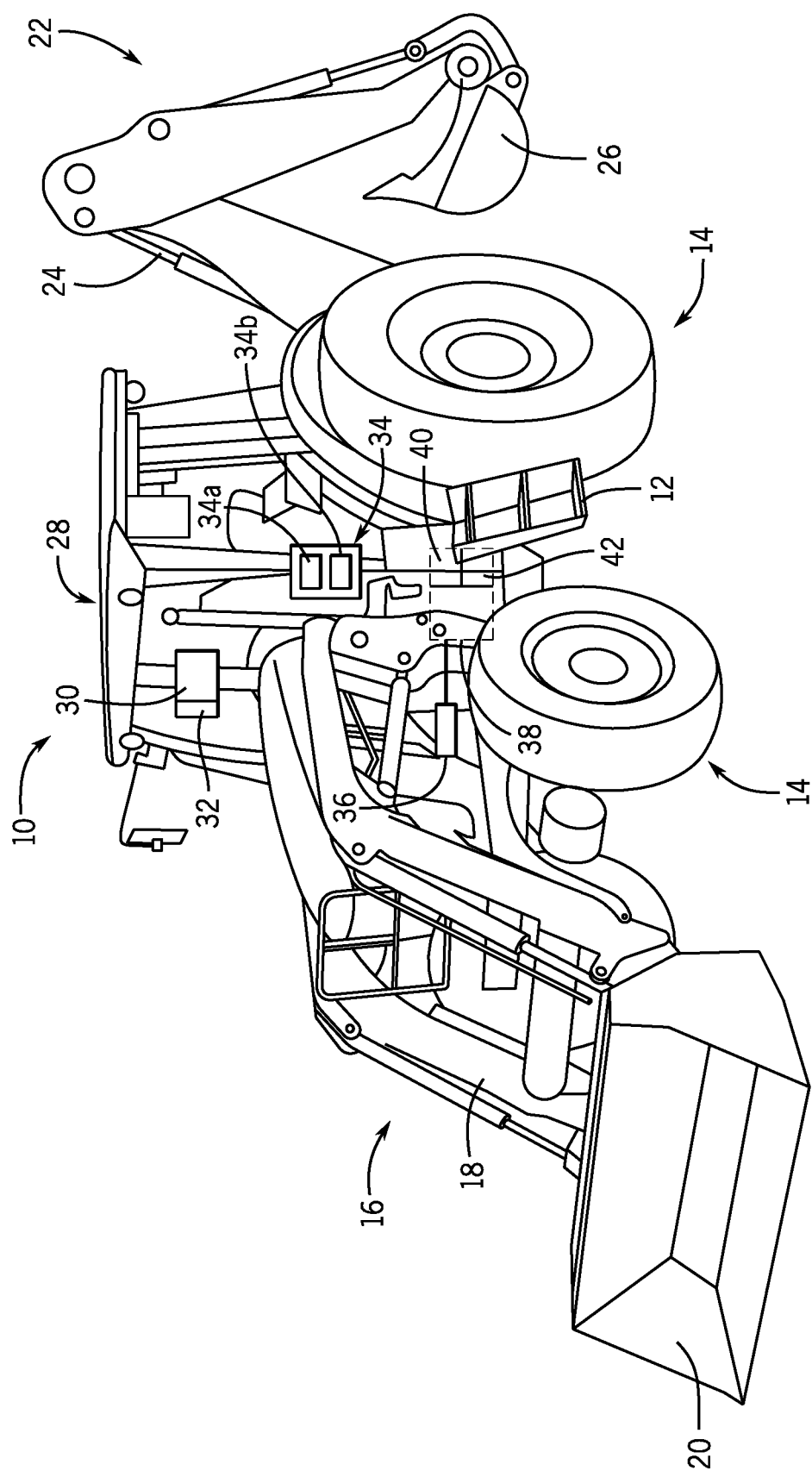
FIG. 1 illustrates an example work vehicle incorporating a transmission assembly that provides improved shift quality, in accordance with an embodiment.

Like reference symbols in the various drawings indicate like elements. For simplicity and clarity of illustration, descriptions and details of well-known features and techniques may be omitted to avoid unnecessarily obscuring the example and non-limiting embodiments described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As previously noted, various types of work vehicles, such as backhoe loaders and tractors as examples, may include a powertrain having an IVT that transfers power from an engine and one or more electrical machines to an output member, such as a vehicle axle or other output shaft. In the use of such work vehicles, it is understood that the IVT will operate in a number of modes as determined by the specific operating conditions and parameters of the work vehicle, which can be generically identified as a mode 1, mode 2, etc. The modes of the IVT control the speed and torque of the output shaft, for example, with the operation of various gears and clutches in the IVT, as well as operation of the electrical machines, being determined by the specified mode.

It is recognized that the electrical machines utilized in many current IVTs are run at very high speeds, such as speeds of up to 10,000 RPM, for example. In order to accommodate the high speed and torque produced by these electrical machines, the transmission must incorporate deeper gear sets that are able to take the speed and torque output from the electrical machine and reduce them down a necessary amount for transfer to the output shaft for a desired traction application. The use of such deeper gear sets, however, results in a large amount of rotor inertia transferring from the electrical machine to the transmission, i.e., a high "reflected inertia." This reflected inertia is problematic when shifting modes in the work vehicle, specifically for a parallel or dual path IVT where engine power and power from the electrical machine are summed in the variator of the IVT for transfer to the output shaft. That is, in operation of the dual path IVT, the electrical machine is required to change its torque output from positive to negative to enable operation of the IVT in different modes. With a high amount of reflected inertia in the system, it is extremely difficult to achieve such a torque reversal without significantly impacting a perceived shift quality in the work vehicle.

To enable improved shift quality in a dual path IVT, a transmission assembly is provided for a work vehicle where the transmission assembly includes an electrical machine unit having two separately and independently driveable rotors (a first rotor and a second rotor) therein, along with a clutch that selectively couples the rotation output from the rotors to the variator in the transmission. Each of the rotors in the electrical machine unit drives a respective shaft, and the clutch can engage either of the shafts, or both the shafts, to a main shaft that outputs rotational power from the electrical machine unit to the variator. The rotors may be driven in either a forward or reverse direction, such that selective operation of the clutch and the two rotors can control both a speed and rotational direction of the main shaft in providing rotational power to the variator.

In an embodiment, operation of the electrical machine unit is controlled by a controller to reduce inertia in the transmission when shifting between different modes of operation. The controller is operably connected to the transmission assembly and to the electrical machine unit, with the controller selectively operating the transmission assembly in a first transmission mode or a second transmission mode and controlling operation of the electrical machine unit and the clutch based on operation in the first transmission mode or the second transmission mode or based on a shift occurring between the first and second modes. With the transmission assembly operating in the first transmission mode or the second transmission mode, the controller may operate the electrical machine unit to drive the first rotor and the second rotor in tandem in the forward rotational direction or the reverse rotational direction. During a lead-in and shifting of the transmission assembly from the first transmission mode to the second transmission mode, the controller may operate the electrical machine unit to drive the first rotor and the second rotor in opposition, with the first rotor driven in the forward rotational direction and the second rotor driven in the reverse rotational direction.

In controlling the electrical machine unit according to one embodiment, the controller operates to identify an upcoming shift in the transmission assembly from the first transmission mode to the second transmission mode. Prior to shifting from the first transmission mode to the second transmission mode, the controller causes the clutch to disengage the second shaft from the main shaft and controls the electrical machine unit to drive the second rotor and the second shaft in the reverse rotational direction after disengaging the second shaft from the main shaft. In subsequently shifting from the first transmission mode to the second transmission mode, the controller then causes the clutch to re-engage the second shaft with the main shaft and disengage the first shaft from the main shaft, thereby causing the main shaft to be driven in the reverse rotational direction. After disengaging the first shaft from the main shaft, and after shifting from the first transmission mode to the second transmission mode, the controller then controls the electrical machine unit to drive the first rotor and the first shaft in the reverse rotational direction and causes the clutch to re-engage the first shaft with the main shaft. Operation of the electrical machine in this manner prior to and during shifting of the transmission assembly from the first transmission mode to the second transmission mode reduces inertia in the electrical machine unit and in the transmission during the shifting.

In controlling the electrical machine unit according to another embodiment, the controller operates to monitor speed and torque parameters in the transmission assembly via a torque observer program. The controller identifies a pile-up condition based on the monitored speed and torque parameters and, responsive thereto, determines an upcoming downshift of the transmission assembly necessary to address the pile-up condition. The controller then controls the clutch to selectively disengage the first shaft or the second shaft, or both the first shaft and the second shaft, from the main shaft prior to the downshift of the transmission assembly.

Example embodiments of a work vehicle having a transmission assembly and controller operated electrical machine unit that implement a transmission shifting control scheme to reduce system inertia in the work vehicle are provided in FIGS. 1-4 according to this disclosure. The following examples notwithstanding, other types of work vehicles and other configurations of transmissions would also benefit from the electrical machine unit and associated control scheme described hereafter. It is therefore recognized that aspects of the invention are not meant to be limited only to the specific embodiments described hereafter.

Example Embodiments of a Transmission Assembly with Electrical Machine Unit for Improved Shift Quality Referring initially to FIG. 1, a work vehicle 10 is shown that can implement details of one or more embodiments. In the illustrated example, the work vehicle 10 is depicted as a backhoe loader, and thus is hereafter referenced as "backhoe loader 10." It will be understood, however, that other configurations may be possible, including configurations with the work vehicle as a mining machine, tractor, a harvester, a log skidder, or one of various other work vehicle types.

The backhoe loader 10 includes a chassis 12 and a ground engaging mechanism or ground drive element 14. The ground engaging mechanism 14 is capable of supporting the chassis 12 and propelling the chassis 12 across the ground. Although the illustrated backhoe loader 10 includes wheels as ground engaging mechanism 14, the backhoe loader 10 may include other ground engaging mechanisms, such as steel tracks, rubber tracks, or other suitable ground engaging members.

The backhoe loader 10 further includes a loader assembly 16 and a backhoe assembly 22. As illustrated in FIG. 1, the loader assembly 16 includes a loader boom 18 and a work tool 20 in the form of a bucket. The work tool 20 may be capable of moving, excavating, plowing, or performing other material handling functions on a load, such as dirt or other materials. Other suitable work tools include, for example, blades, pallet forks, bale lifts, augers, harvesters, tillers, mowers, and grapples. The loader boom 18 is configured to move relative to the chassis 12 to move and operate the work tool 20. The backhoe assembly 22 of the backhoe loader 10 includes a backhoe boom 24 and a tool such as a backhoe bucket 26 having telehandler tool features. The backhoe boom 24 is attached to the chassis 12 by a swing frame, with the backhoe boom 24 being pivotable relative to the chassis 12. The backhoe bucket 26 is in turn pivotably mounted to the backhoe boom 24 and extendable away therefrom via an extendable dipperstick, such that the backhoe bucket 26 has further freedom of movement during operation.

An operator or autonomous control may operate the backhoe loader 10, including the ground engaging wheels 14, the loader assembly 16, and the backhoe assembly 22, from an operator station 28 in the backhoe loader 10. While not shown in FIG. 1, it is recognized that the operator station 28 may include a human-vehicle interface 30 and various controls therein configured to receive input commands from the operator to control, for example, various electric or hydraulic systems associated with actuating and controlling the loader assembly 16 and the backhoe assembly 22. The human-vehicle interface 30 may be configured in a variety of ways and may include input devices 32 that may include one or more joysticks, various switches or levers, one or more buttons, a touchscreen interface that may be overlaid on a display, a keyboard, a speaker, a microphone associated with a speech recognition system, or various other human-machine interface devices.

The backhoe loader 10 includes a controller 34 (or multiple controllers) to control various aspects of the operation of the backhoe loader 10. Generally, the controller 34 (or others) may be configured as a computing device with associated processor devices 34a and memory architectures 34b, as a hard-wired computing circuit (or circuits), as a programmable circuit, as a hydraulic, electrical, or electro-hydraulic controller, or otherwise. As such, the controller 34 may be configured to execute various computational and control functionality with respect to the backhoe loader 10. In some embodiments, the controller 34 may be configured to receive input signals in various formats (e.g., as hydraulic signals, voltage signals, current signals, and so on), and to output command signals in various formats (e.g., as hydraulic signals, voltage signals, current signals, mechanical movements, and so on). In one embodiment, the controller 34 may be configured to receive input commands and to interface with the operator via the human-vehicle interface 30.

The controller 34 may be in electronic, hydraulic, mechanical, or other communication with various other systems or devices of the backhoe loader 10. For example, the controller 34 may be in electronic or hydraulic communication with various actuators, sensors, and other devices within (or outside of) the backhoe loader 10, including various devices described below. The controller 34 may communicate with other systems or devices (including other controllers) in various known ways, including via a CAN bus (not shown) of the backhoe loader 10, via wireless or hydraulic communication means, or otherwise. An example location for the controller 34 is depicted in FIG. 1; however, it is understood that other locations on the backhoe loader 10 are possible.

As described in greater detail below, the controller 34 may facilitate the input of various types of operator commands and collection of various types of vehicle operating parameter data associated with the backhoe loader 10 as part of implementing a transmission shifting scheme in the backhoe loader 10. As indicated above, operator commands may be input to the controller 34 via the human-vehicle interface 30, while the vehicle operational parameter data may be in the form of raw data from the applicable sensors described below (or other sources) or undergo some processing in the controller 34 to extract the desired characteristics. Inputs and data received by the controller 34 are utilized to shifting between different transmission modes in the backhoe loader 10 via operation and control of a transmission 36 included in the backhoe loader 10, on which further details will be provided below.

The backhoe loader 10 includes a source of propulsion that, in an example embodiment, is provided as a hybrid electric drive system that includes an engine 38 and a plurality of electrical machine units 40, 42. The engine 38 and the electrical machine units 40, 42 may supply power to the transmission 36.

In one example, the engine 38 is an internal combustion engine, such as a diesel engine, that is controlled by the controller 34 to enable start-up of the engine 38, enable shutdown of the engine 38, disable operation of the engine 38, and/or to modify some aspect of operation of the engine 38 or associated system, for example, based on input received from the human-vehicle interface 30. The backhoe loader 10 may include an engine speed sensor 46 configured to determine the speed of the engine 38 during operation.

In one example, the electrical machine units 40, 42 are AC motors, such as permanent magnet AC motors or induction motors. In one implementation, and as will be explained in greater detail in FIG. 2, a first electrical machine unit 40 may receive mechanical power from the engine 38 and convert this power to electrical power, with electrical power from the first electrical machine unit 40 then being provided to the second electrical machine unit 42. This electrical power may then be re-converted by the second electrical machine unit 42 for mechanical output. The electrical machine units 40, 42 may be controlled by the controller 34 to control a speed and operational mode thereof, with the first electrical machine unit 40 operable in a "regenerative mode" to convert mechanical energy into electric energy and the second electrical machine unit 42 operable in a "motoring mode" to convert electrical energy into mechanical energy.

The transmission 36 transfers power from the engine 38 and second electrical machine unit 42 to a suitable driveline (not shown) coupled to the ground engaging wheels 14 of the backhoe loader 10, which may include front and rear wheels, to enable the backhoe loader 10 to move. As described in greater detail below when referring to FIG. 2, the transmission 36 may be configured as a hybrid electric transmission or IVT that combines outputs from both the engine 38 and the second electrical machine units 42 to provide a final power delivery (e.g., to a vehicle axle), on which further details will be provided below. The transmission 36 may include sensors 48 that measure one or more characteristics of the transmission 36, such as the transmission output speed, transmission torque, and transmission gear, for example.

Figure 2:
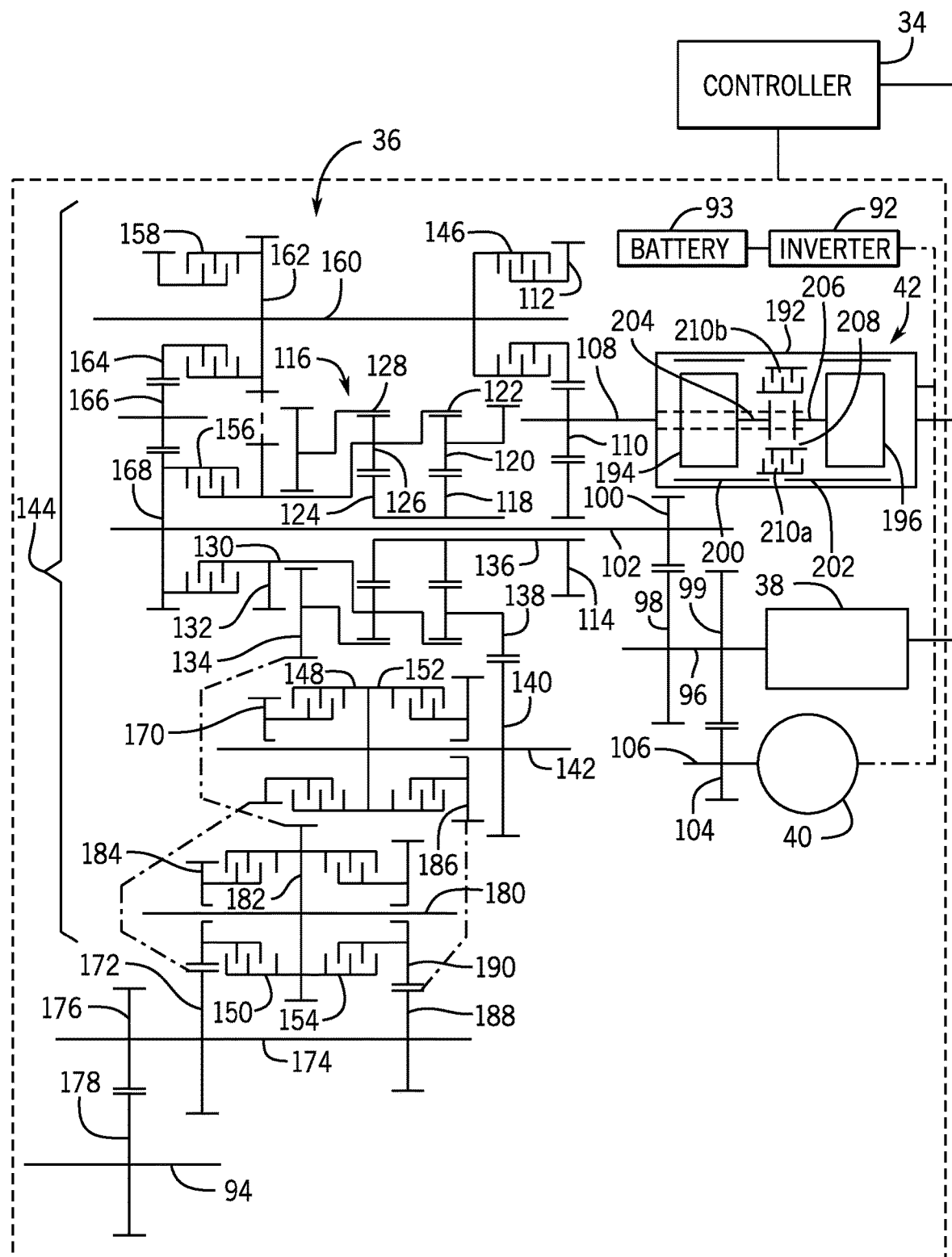
FIG. 2 is a schematic diagram of an example transmission assembly included in the work vehicle of FIG. 1, in accordance with an embodiment.

Referring to FIG. 2, an example of a hybrid electric transmission assembly 84 included in the backhoe loader 10 is illustrated that provides a more detailed discussion of the structure and arrangement of the engine 38, electrical machine units 40, 42, and transmission 36 of the backhoe loader 10 and how the transmission 36 may be operated to reduce inertia in the transmission 36 as part of a transmission shifting scheme implemented by the controller 34. It is recognized that the transmission assembly 84 illustrated in FIG. 2 and described here below is merely an example and that transmissions having different arrangements or constructions could instead incorporate details of this disclosure.

In the illustrated embodiment, the transmission assembly 84 includes the transmission 36, the first electrical machine unit 40, and the second electrical machine unit 42. The first electrical machine unit 40 and second electrical machine unit 42 may be connected by an electrical conduit 90. A power inverter 92 may be included and may be operably connected to the first electrical machine unit 40 and/or the second electrical machine unit 42. In some embodiments, the power inverter 92 may feed energy to and/or receive energy from a battery assembly 93 (change in FIG. 2). Also, the power inverter 92 may feed energy to and/or receive energy from the transmission assembly 84. Moreover, in some embodiments, the power inverter 92 may off-board power to an implement and/or another energy off-boarding device (not shown).

The transmission 36 transfers power from the engine 38 and the second electrical machine unit 42 to an output shaft 94. As described below, the transmission 36 includes a number of gearing, clutch, and control assemblies to suitably drive the output shaft 94 at different speeds and in multiple directions. Generally, in one example, the transmission 36 of transmission assembly 84 may be any type of electric infinitely variable transmission arrangement (eIVT), with it recognized that alternatives to the transmission illustrated in FIG. 2 may be included in the transmission assembly 84.

The engine 38 may provide rotational power via an engine output element, such as a flywheel, to an engine shaft 96 according to commands from the controller 34 based on the desired operation. The shaft 96 may be configured to provide rotational power to a gear 98 and a gear 99. The gear 98 may be enmeshed with a gear 100, which may be supported on (e.g., fixed to) a shaft 102. The shaft 102 may be substantially parallel to and spaced apart from the engine shaft 96. The shaft 102 may support various components of the transmission assembly 84 as will be discussed in detail.

The gear 99 may be enmeshed with a gear 104, which is supported on (e.g., fixed to) a shaft 106. The shaft 106 may be substantially parallel to and spaced apart from the engine shaft 96, and the shaft 106 may be connected to the first electrical machine unit 40. Accordingly, mechanical power from the engine (i.e., engine power) may transfer via the engine shaft 96, to the enmeshed gears 99, 104, to the shaft 106, and to the first electrical machine unit 40. The first electrical machine unit 40 may convert this power to electrical power for transmission over the conduit 90 to the second electrical machine unit 42. This converted and transmitted power may then be re-converted by the second electrical machine unit 42 for mechanical output along a shaft 108. Various known control devices (not shown) may be provided to regulate such conversion, transmission, re-conversion, and so on. Also, in some embodiments, the shaft 108 may support a gear 110 (or other similar component). The gear 110 may be enmeshed with and may transfer power to a gear 112. The gear 110 may also be enmeshed with and may transfer power to a gear 114. Accordingly, power from the second electrical machine unit 42 may be divided between the gear 112 and the gear 114 for transmission to other components as will be discussed in more detail below.

The transmission assembly 84 may further include a variator 116 that represents one example of an arrangement that enables an infinitely variable power transmission between the engine 38 and second electrical machine unit 42 and the output shaft 94. In some embodiments, the variator 116 may include at least two planetary gearsets. In some embodiments, the planetary gearset may be interconnected and supported on a common shaft, such as the shaft 102, and the planetary gearsets may be substantially concentric. In other embodiments, the different planetary gearsets may be supported on separate, respective shafts that are nonconcentric. The arrangement of the planetary gearsets may be configured according to the available space within the backhoe loader 10 for packaging the transmission assembly 84.

As shown in the embodiment of FIG. 2, the variator 116 may include a first planetary gearset (i.e., a "low" planetary gearset) with a first sun gear 118, first planet gears and associated carrier 120, and a first ring gear 122. Moreover, the variator 116 may include a second planetary gearset (i.e., a "high" planetary gearset) with a second sun gear 124, second planet gears and associated carrier 126, and a second ring gear 128. The second planet gears and carrier 126 may be directly attached to the first ring gear 122. Also, the second planet gears and carrier 126 may be directly attached to a shaft 130 having a gear 132 fixed thereon. Moreover, the second ring gear 128 may be directly attached to a gear 134. As shown, the shaft 130, the gear 132, and the gear 134 may each receive and may be substantially concentric to the shaft 102. Although not specifically shown, it will be appreciated that the transmission assembly 84 may include various bearings for supporting these components concentrically. Specifically, the shaft 130 may be rotationally attached via a bearing to the shaft 102, and the gear 134 may be rotationally attached via another bearing on the shaft 130.

On the opposite side of the variator 116 (from left to right in FIG. 2), the gear 114 may be mounted (e.g., fixed) on a shaft 136, which also supports the first and second sun gears 118, 124. In some embodiments, the shaft 136 may be hollow and may receive the shaft 102. A bearing (not shown) may rotationally support the shaft 136 on the shaft 102 substantially concentrically.

Furthermore, the first planet gears and associated carrier 120 may be attached to a gear 138. The gear 138 may be enmeshed with a gear 140, which is fixed to a shaft 142. The shaft 142 may be substantially parallel to and spaced apart from the shaft 102.

As noted above, the transmission assembly 84 may be configured for delivering power (from the engine 38 and the second electrical machine unit 42) to the output shaft 94 via the transmission 36. The output shaft 94 may be configured to transmit this received power to ground engaging mechanism 14 of the backhoe loader 10.

The transmission assembly 84 may operate in what be alternately be described as a parallel path, dual path, or split path mode, so that power from the engine 38 and the second electrical machine unit 42 may be summed by the variator 116, with the summed or combined power delivered to the output shaft 94. The transmission assembly 84 may also have different speed modes in the split path mode, and these different speed modes may provide different angular speed ranges for the output shaft 94. Furthermore, the transmission assembly 84 may have one or more forward modes for moving the backhoe loader 10 in a forward direction one or more reverse modes for moving the backhoe loader 10 in a reverse direction. According to embodiments, it is also possible for the transmission assembly 84 to operate in a direct drive mode where power from the engine 38 may be transmitted to the output shaft 94, and power from the second electrical machine unit 42 may be prevented from transferring to the output shaft 94, or in a series mode where power from the second electrical machine unit 42 may be transmitted to the output shaft 94 and power from the engine 38 may be prevented from transferring to the output shaft 94.

The transmission assembly 84 may switch between the speed or directional modes (or from the dual path mode to the series or direct drive mode), for example, using a control assembly 144. The control assembly 144 may include one or more selectable transmission components. The selectable transmission components may have first positions (engaged positions), in which the respective device transmits power from an input component to an output component. The selectable transmission components may also have a second position (a disengaged position), in which the device prevents power transmission from the input to the output component. The selectable transmission components of the control assembly 144 may include one or more wet clutches, dry clutches, dog collar clutches, brakes, synchronizers, or other similar devices. The control assembly 144 may also include an actuator for actuating the selectable transmission components between the first and second positions.

As shown in FIG. 2, the control assembly 144 may include a first clutch 146, a second clutch 148, a third clutch 150, a fourth clutch 152, and a fifth clutch 154. Also, the control assembly 144 may include a forward directional clutch 156 and a reverse directional clutch 158. In some embodiments, the first clutch 146 may be mounted and supported on a shaft 160. Also, the first clutch 146, in an engaged position, may engage the gear 112 with the shaft 160 for rotation as a unit. The first clutch 146, in a disengaged position, may allow the gear 112 to rotate relative to the shaft 160. Also, a gear 162 may be fixed to the shaft 160, and the gear 162 may be enmeshed with the gear 132 that is fixed to the shaft 130. The reverse directional clutch 158 may be supported on the shaft 160 (i.e., commonly supported on the shaft 160 with the first clutch 146). The reverse directional clutch 158 may engage and, alternatively, disengage the gear 162 and a gear 164. The gear 164 may be enmeshed with an idler gear 166, and the idler gear 166 may be enmeshed with a gear 168. The forward directional clutch 156 may be supported on gear 168, which is in turn supported on the shaft 102, to selectively engage shaft 130. Thus, the forward directional clutch 156 may be concentric with both the shaft 130 and the shaft 102. The second clutch may be supported on the shaft 142. The second clutch 148 may engage and, alternatively, disengage the shaft 142 and a gear 170. The gear 170 may be enmeshed with a gear 172. The gear 172 may be fixed to and mounted on a countershaft 174. The countershaft 174 may also support a gear 176. The gear 176 may be enmeshed with a gear 178, which is fixed to the output shaft 94.

The third clutch 150 may be supported on a shaft 180. The shaft 180 may be substantially parallel and spaced at a distance from the shaft 142. Also, a gear 182 may be fixed to and supported by the shaft 180. The gear 182 may be enmeshed with the gear 134 as shown. The third clutch 150 may engage and, alternatively, disengage the gear 182 and a gear 184. The gear 184 may be enmeshed with the gear 172. The fourth clutch 152 may be supported on the shaft 142 (in common with the second clutch 148). The fourth clutch 152 may engage and, alternatively, disengage the shaft 142 and a gear 186. The gear 186 may be enmeshed with a gear 188, which is mounted on and fixed to the countershaft 174. Additionally, the fifth clutch 154 may be supported on the shaft 180 (in common with and concentric with the third clutch 150). The fifth clutch 154 may engage and, alternatively, disengage the shaft 180 and a gear 190. The gear 190 may be enmeshed with the gear 188.

As indicated previously, the transmission assembly 84 is operable in a number of modes based on selective operation of the transmission, including a split-path mode in which power from the engine 38 and the second electrical machine unit 42 are combined. As introduced above, the controller 34 is coupled to the control assembly 144 for controlling one or more actuators and, as a result, controlling movement of the one or more selective transmission components within the transmission 36, including the first clutch 146, the second clutch 148, the third clutch 150, the fourth clutch 152, the fifth clutch 154, the forward directional clutch 156 and the reverse directional clutch 158. Generally, the controller 34 operates the control assembly 144, as well as the engine 38 and second electrical machine unit 42, to implement the desired function, e.g., to achieve the requested torque at the output shaft 94 for overall control of the backhoe loader 10. This includes vehicle accelerations, stops, starts, shifting between gear ratios, shifting between directions, and the like.

According to embodiments, the transmission 36 and the second electrical machine unit 42 are operable to reduce inertia in the transmission 36 (i.e., the various gears thereof) when the transmission assembly 84 is shifting between modes of operation, such as when the transmission assembly 84 is shifting between speed modes or forward and reverse modes during normal operation or when the transmission assembly 84 is force to shift responsive to a pile-crash condition (i.e., introduction of a sudden large external load to the transmission assembly 84. As described below, the structure of the second electrical machine unit 42 and the operation thereof by controller 34 reduces the amount of inertia transferred from the second electrical machine unit 42 to the transmission 36 (i.e., reflected inertia) during such shifting.

Referring still to FIG. 2, the second electrical machine unit 42 is shown as being configured as a split-rotor electrical machine that is housed within a unit housing 192. The split-rotor electrical machine includes a first rotor portion 194 (here after "first rotor 194") and a second rotor portion 196 (here after "second rotor 196") that are separately and independently driveable. The first rotor 194 and second rotor 196 are driven via electromagnetic interaction with a stator assembly 198 that, in the illustrated embodiment, is composed of a first stator 200 and a second stator 202 that are separately constructed, although it is recognized that the stator assembly 198 could instead be constructed as a single stator that drives both rotors 194, 196. Via interaction with the first stator 200, the first rotor 194 rotatably drives a first shaft 204 coupled thereto and, similarly, the second rotor 196 rotatably drives a second shaft 206 coupled thereto via interaction with the second stator 202.

Also included in the second electrical machine unit 42 and within the unit housing 192 are gearing 208 and a clutch arrangement 210. The clutch arrangement 210 is configured as a dual clutch configured to selectively engage and disengage each of the first shaft 204 and the second shaft 206 from the shaft 108 (here after referred to as the "main shaft 108" of the second electrical machine unit 42). The clutch arrangement 210 therefore allows for the main shaft 108 to be driven by only the first shaft 204 (via first rotor 194), by only the second shaft 206 (via second rotor 196), or by both the first shaft 204 and the second shaft 206.

Figure 3:
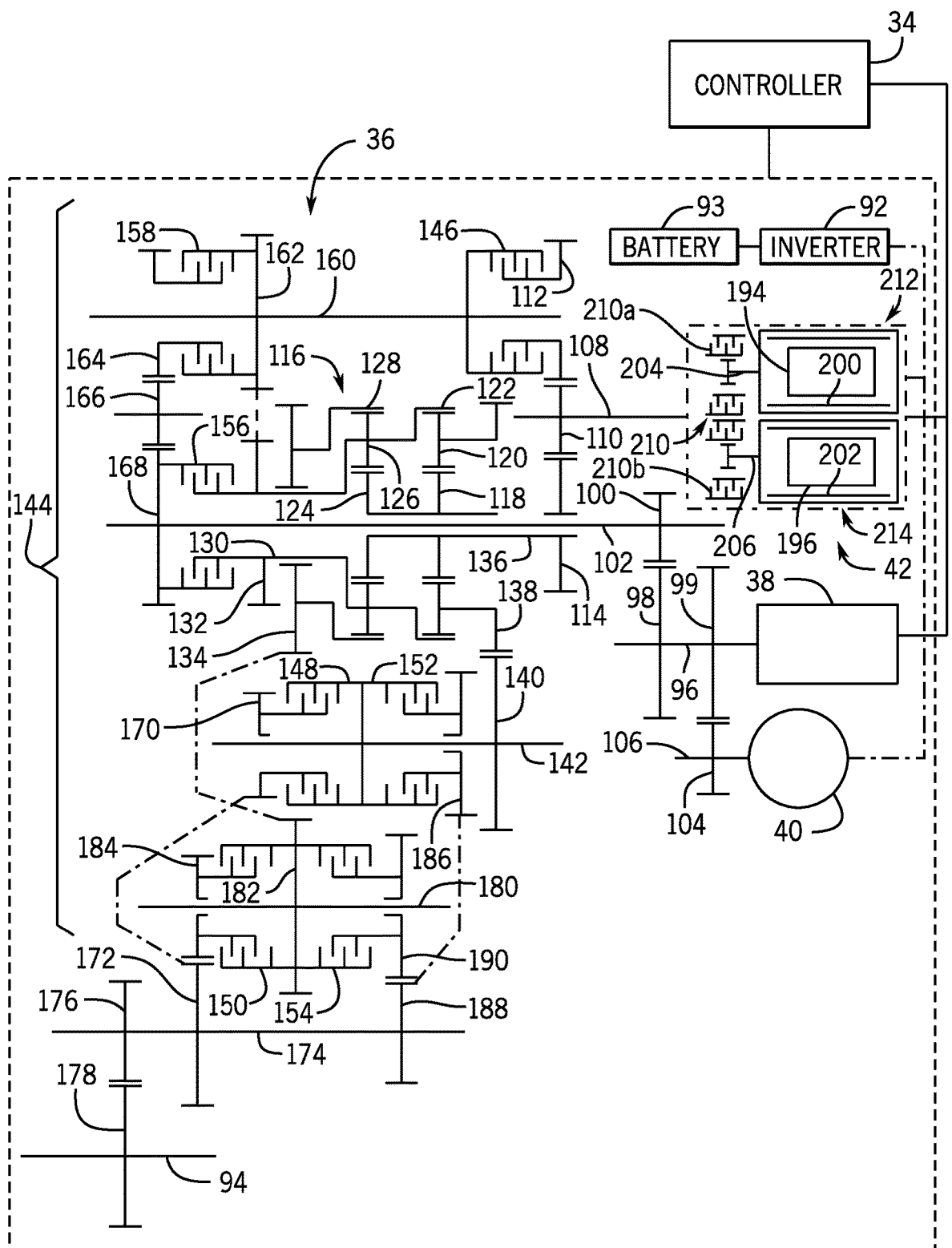
FIG. 3 is a schematic diagram of an example transmission assembly included in the work vehicle of FIG. 1, in accordance with another embodiment.

An alternate embodiment of the second electrical machine unit 42 is shown in FIG. 3, with the second electrical machine unit 42 being comprised of separate first and second electrical machines 212, 214 that are separately and independently driveable. The first electric machine 212 includes a first rotor 194 and a first stator 200, while the second electric machine 214 includes a second rotor 196 and a second stator 202. Via interaction with the first stator 200, the first rotor 194 rotatably drives a first shaft 204 coupled thereto and, similarly, the second rotor 196 rotatably drives a second shaft 206 coupled thereto via interaction with the second stator 202.

Also included in the second electrical machine unit 42 are gearing 208 and a clutch arrangement 210. The clutch arrangement 210 is configured to selectively engage and disengage each of the first shaft 204 and the second shaft 206 from the main shaft 108 of the second electrical machine unit 42. The clutch arrangement 210 therefore allows for the main shaft 108 to be driven by only the first shaft 204 (via first rotor 194), by only the second shaft 206 (via second rotor 196), or by both the first shaft 204 and the second shaft 206.

In each of the embodiments of the second electrical machine unit 42 shown in FIGS. 2 and 3, the controller 34 operates the second electrical machine unit 42 in a controlled manner to control a rotational direction and torque output thereof. The controller may operate the second electrical machine unit 42 to provide a desired torque output to the variator 116 during operation of the transmission 36 in a specified mode of operation. The controller 34 may also, as previously indicated, operate the second electrical machine unit 42 according to a transmission shifting scheme when it is determined that a transmission shifting is to occur in for the transmission 36, so as to reduce inertia in the transmission 36 (i.e., the various gears thereof) during the transmission shifting. That is, it is recognized that when shifting between different operational modes of the transmission assembly 84 (between speed modes or forward and reverse modes, for example), it may be necessary to change a direction of the torque output of the second electrical machine unit 42 (i.e., from positive to negative or from negative to positive). The second electrical machine unit 42 may therefore be selectively controlled by the controller 34 to reduce inertia in the transmission 36 when changing the direction of the torque output of the second electrical machine unit 42.

Figure 4:
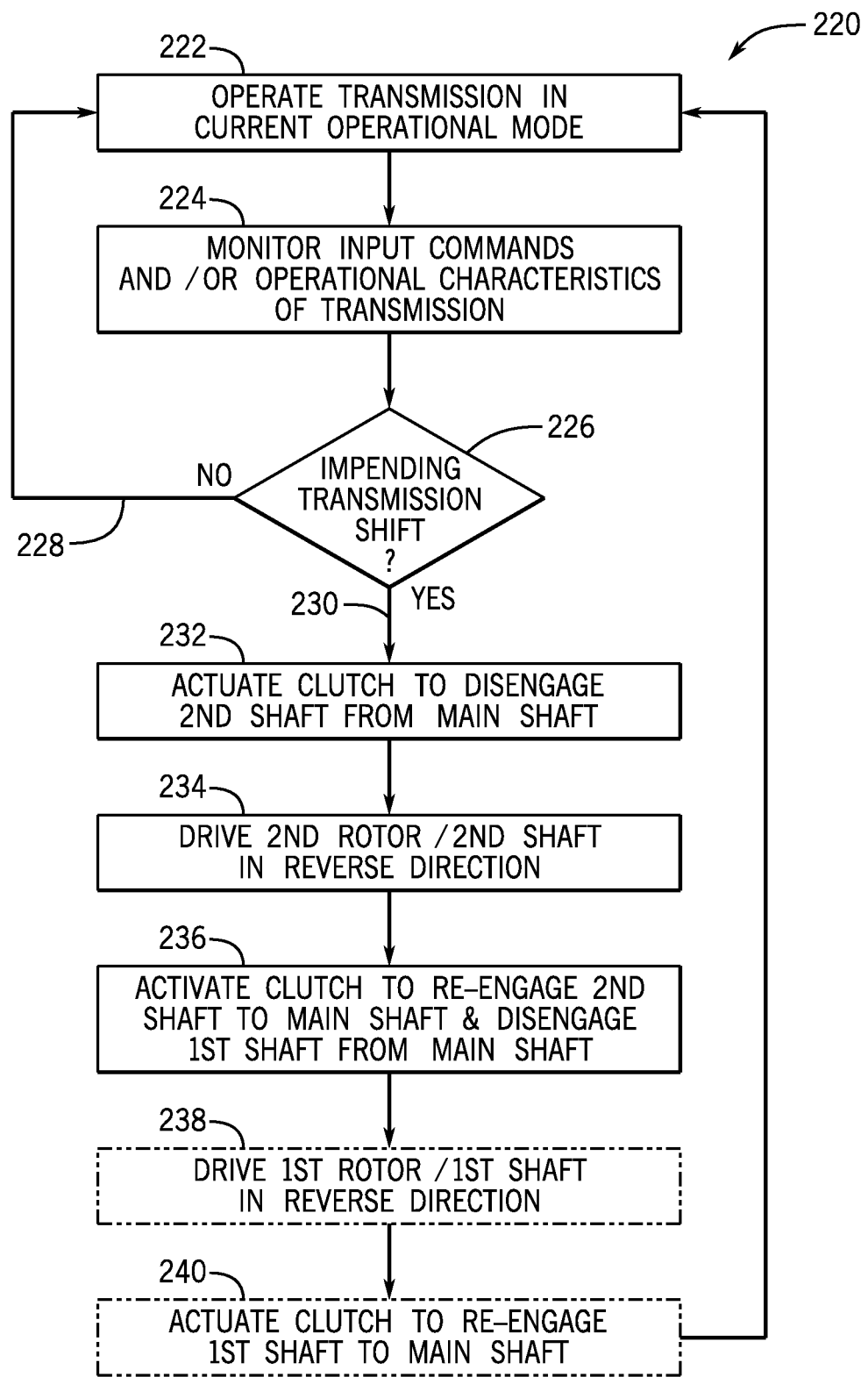
FIG. 4 is a flowchart of a control scheme for transmission shifting in a work vehicle when shifting between different speed modes or directional modes.

Referring now to FIG. 4, and with continued reference to FIGS. 1-3, a flowchart of a method 220 for controlling operation of the second electrical machine unit 42 during operation of the transmission assembly 84 is provided in accordance with the present disclosure, such as may be performed by the controller 34. Generally, the method 220 is implemented during operation of the backhoe loader 10, with the transmission assembly 84 of the backhoe loader 10 operating in a particular mode or when shifting between different modes is required.

The method 220 begins at step 222 with the transmission assembly 84 operating in a current operational mode. During operation in this current mode, the controller 34 operates the control assembly 144 (i.e., selectable transmission components thereof), as well as the engine 38 and second electrical machine unit 42, to achieve the requested torque at the output shaft 94 for overall control of the backhoe loader 10. The method 220 then continues at step 224 by monitoring for input commands from an operator and/or by monitoring various operational characteristics or parameters of the backhoe loader 10 and transmission assembly 84. Monitoring of operational characteristics may be performed generally by sensors included in the backhoe loader 10 (e.g., sensors 48 in FIG. 1) that measure one or more characteristics of the transmission assembly 84, such as the transmission output speed, transmission torque, and transmission gear, for example.

Operator commands and/or readings of the operational characteristics of the transmission assembly 84 are provided to the controller 34 and, at step 226, a determination is made by the controller 34 regarding whether a shifting from a current transmission operating mode to another transmission operating mode is impending. If the controller 34 determines that no impending shift has been identified, as indicated at 228, then the method 220 loops back to step 222, with the transmission continuing to operate in its current operational mode and with continued monitoring for operator input commands and/or operational characteristics of the transmission assembly 84 at step 224. Alternatively, if the controller 34 determines an identified that an impending shift in the transmission assembly 84 is desired or necessary, as indicated at 230, then the method 220 continues to steps 232-240, which can collectively referred to as a transmission shifting scheme by which the transmission 36 and second electrical machine unit 42 are operated to enable the shift between operational modes. Specifically, the second electrical machine unit 42 may be operated to control/change the amount and direction of the torque output therefrom (to the variator 116), while the control assembly 144 is operated to control the transfer of power to the output shaft 94. This operational shifting is generally referred to here after as being from a "first transmission mode" to a "second transmission mode," with it being understood that this can refer to shifting between any two operational modes during operation of the transmission 36.

As shown at step 232 in the described embodiment, performing of the transmission shifting scheme by the controller 34 begins with the controller 34 actuating the clutch arrangement 210 (i.e., a second clutch 210b thereof) of the second electrical machine unit 42 to cause the second shaft 206 to disengage from the main shaft 108. The second shaft 206 is disengaged from the main shaft 108 prior to the transmission 36 shifting from the first transmission mode to the second transmission mode, with the second shaft 206 and second rotor 196 therefor being decoupled from the main shaft 108. The disengaging of the second shaft 206 from the main shaft 108 may occur while both the first shaft 204 and the second shaft 206 are being driven by the first rotor 194 and the second rotor 196, respectively, such as the first and second shafts 204, 206 being driven in tandem in a forward direction, for example.

Upon the second shaft 206 being disengaged from the main shaft 108, the controller 34 next controls the second electrical machine unit 42 to drive the second rotor 196 in an opposing direction from its current rotational direction at step 234. In the described embodiment, the second rotor 196 is thus driven in the reverse direction at step 234. Driving of the second rotor 196 in the reverse direction may be achieved via selectively providing current to the second stator 202 to control the electromagnetic interaction between the second stator 202 and the second rotor 196. Driving of second rotor 196 in the reverse direction thus causes a corresponding rotation of the second shaft 206 in the reverse direction, with the second shaft 206 rotating in the reverse direction while the second shaft 206 remains disengaged from the main shaft 108 and prior to shifting from the first transmission mode to the second transmission mode.

Moving to step 236, the method 220 continues with the controller 34 actuating the clutch arrangement 210 (i.e., first clutch 210a and second clutch 210b thereof) of the second electrical machine unit 42 to re-engage the second shaft 206 with the main shaft 108 and disengage the first shaft 204 from the main shaft 108. The actuation of the clutch arrangement 210 at step 236 occurs in concert with the transmission 36 shifting from the first transmission mode to the second transmission mode, including controlling of the selectable transmission components of the control assembly 144. The engaging of the second shaft 206 (that is rotating in the reverse direction via driving thereof by second rotor 196) with the main shaft 108 and the disengaging of the first shaft 204 (that is rotating in the forward direction via driving thereof by first rotor 194) from the main shaft 108 causes the main shaft 108 to be driven in the reverse rotational direction. The torque output of the main shaft 108 may thus be provided to the variator 116 and summed with the torque provided by the engine shaft 96 for transferring (through the transmission 36) to the output shaft 94, according to operation of the transmission in the second transmission mode.

According to one embodiment, additional steps 238, 240 are optionally performed as part of the transmission shifting scheme, with steps 238, 240 thus being shown in phantom in FIG. 4. As shown at step 238, upon the first shaft 204 being disengaged from the main shaft 108, the controller 34 next controls the second electrical machine unit 42 to drive the first rotor 194 in an opposing direction from its current rotational direction. In the described embodiment, the first rotor 194 is thus driven in the reverse direction at step 238. Driving of the first rotor 194 in the reverse direction may be achieved via selectively providing current to the first stator 200 to control the electromagnetic interaction between the first stator 200 and the first rotor 194. Driving of first rotor 194 in the reverse direction thus causes a corresponding rotation of the first shaft 204 in the rotational direction, with the first shaft 204 rotating in the reverse direction while the first shaft 204 remains disengaged from the main shaft 108. At step 240, the controller 34 actuates the clutch arrangement 210 (i.e., first clutch 210*a*) of the second electrical machine unit 42 to re-engage the first shaft 204 with the main shaft 108. The engaging of the first shaft 204 (that is rotating in the reverse direction via driving thereof by first rotor 194) with the main shaft 108 causes additional torque to be provided to the main shaft 108, in addition to the torque being provided by the second shaft 206.

In another embodiment, and alternatively to the method 220 including steps 238, 240, upon actuating the clutch arrangement 210 to re-engage the second shaft 206 with the main shaft 108 and disengage the first shaft 204 from the main shaft 108, the first shaft 204 could remain disengaged from the main shaft 108 following shifting of the transmission 36 from the first transmission mode to the second transmission mode. In such an embodiment, the first rotor 194 could remain idle during ongoing operation of the transmission 36 in the second transmission mode. This maintaining of the first rotor 194 in an idled condition could be desirable in low-load situations where torque from the first rotor 194 and first shaft 204 to the main shaft 108 is not required, as idling of the first rotor 194 would eliminate the parasitic drag and windage associated with operation thereof.

After completion of step 236 (and optional steps 238, 240), the method 220 would loop back to step 222 while operating in the second transmission mode. The method 220 would then be performed again to identify if/when another impending shift might occur in the transmission assembly 84, whether shifting back to the first transmission mode or a third transmission mode, for example.

Figure 5:
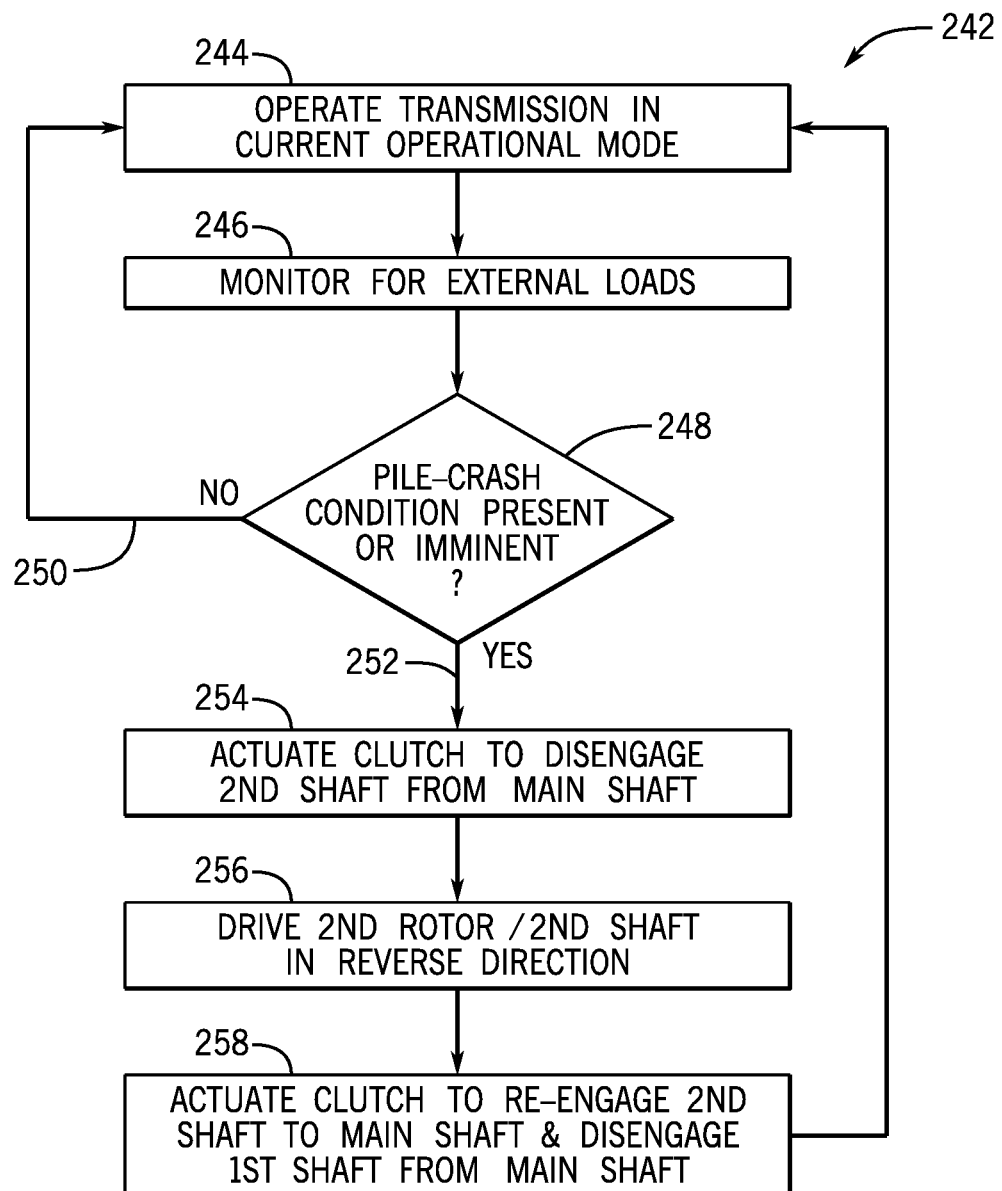
FIG. 5 is a flowchart of a control scheme for transmission shifting in a work vehicle in response to a pile-crash occurrence.

Referring now to FIG. 5, and with continued reference to FIGS. 1-3, a flowchart of another method 242 for controlling operation of the second electrical machine unit 42 during operation of the transmission assembly 84 is provided in accordance with the present disclosure, such as may be performed by the controller 34. Generally, the method 242 is implemented during operation of the backhoe loader 10, with the transmission assembly 84 of the backhoe loader 10 operating in a particular mode and a "pile-crash" (i.e., sharp increase in external load) being encountered that necessitates an abrupt downshifting of the transmission.

The method 242 begins at step 244 with the transmission assembly 84 operating in a current operational mode. During operation in this current mode, the controller 34 operates the control assembly 144 (i.e., selectable transmission components thereof), as well as the engine 38 and second electrical machine unit 42, to achieve the requested torque at the output shaft 94 for overall control of the backhoe loader 10. The method 242 then continues at step 246 by monitoring for external loads applied to the backhoe loader 10, with this monitoring being performed by an observer algorithm stored and/or run by the controller 34. The monitoring for external loads is achieved via feedback obtained on various operational characteristics or parameters of the backhoe loader 10 and transmission assembly 84, with such feedback obtained by sensors included in the backhoe loader 10 (e.g., sensors 48 in FIG. 1) that measure one or more characteristics of the transmission 36, such as the transmission output speed and transmission torque. Specifically, in one embodiment, the transmission output speed may be monitored along with a torque being applied to the transmission 36 by the second electrical machine unit 42 and an inertia present in the system. For any changes in torque applied by the second electrical machine unit 42, the transmission output speed (and acceleration in the change of that speed) is monitored and compared against an expected transmission output speed (and acceleration) that should result from that application of torque (and inertia in the system). If there is a difference between the actual monitored speed and/or acceleration versus the expected speed and/or acceleration, then the observer determines that an external torque must be acting on the backhoe loader 10—and this external torque is classified as an external load or "pile-crash" condition that is occurring or is imminent to occur.

From the observer monitoring described above, a determination is thus made by the controller 34 at step 248 regarding whether a pile-crash condition is present or imminent that would necessitate a downshifting from a current transmission operating mode to another lower transmission operating. If the controller 34 determines that no pile-crash condition is present or imminent, as indicated at 250, then the method 242 loops back to step 246, with the controller 34 continuing to monitor for external loads applied to the backhoe loader 10. Alternatively, if the controller 34 determines that a pile-crash condition is present or imminent, as indicated at 252, then the method continues to steps 254-258, which can collectively referred to as a transmission shifting scheme by which the transmission 36 and second electrical machine unit 42 are operated to enable a rapid downshifting in the transmission 36 to address the pile-crash condition. Specifically, the second electrical machine unit 42 may be operated to selectively disengage one or both of the rotors 194, 196 therein to lower the torque output provided to the variator 116, thereby lowering the inertia reflected to the transmission 36 during downshifting thereof (i.e., in operating/actuating components of the control assembly 144 to control the transfer of power to the output shaft 94).

As shown at step 254 in the described embodiment, performing of the transmission shifting scheme begins with the controller 34 actuating the clutch arrangement 210 (i.e., a second clutch 210*b* thereof) of the second electrical machine unit 42 to cause the second shaft 206 to disengage from the main shaft 108. The second shaft 206 is disengaged from the main shaft 108 prior to the transmission 36 downshifting to address the pile-crash condition, with the second shaft 206 and second rotor 196 therefor being decoupled from the main shaft 108. The disengaging of the second shaft 206 from the main shaft 108 may occur while both the first shaft 204 and the second shaft 206 are being driven by the first rotor 194 and the second rotor 196, respectively, such as the first and second shafts 204, 206 being driven in tandem in a forward direction, for example.

In one embodiment, upon the second shaft 206 being disengaged from the main shaft 108, the controller 34 next controls the second electrical machine unit 42 to drive the second rotor 196 (and second shaft 206) in an opposing direction from its current rotational direction at step 256. In the described embodiment, the second rotor 196 is thus driven in the reverse direction at step 256, with the second shaft 206 remaining disengaged from the main shaft 108 while driving the second rotor 196 is thus driven in the reverse direction. As indicated above, this decoupling of the second shaft 206 from the main shaft 108 lowers the inertia reflected to the transmission 36 during downshifting thereof, which enables an operator to more easily hit shift points or shift windows during downshifting of the transmission 36, thereby providing for a smoother downshifting that minimizes wear or damage that might be inflicting on the transmission during the rapid downshifting.

Moving to step 258, the method 242 may continue with the controller 34 actuating the clutch arrangement 210 (i.e., first clutch 210a and second clutch 210b thereof) of the second electrical machine unit 42 to re-engage the second shaft 206 with the main shaft 108 and disengage the first shaft 204 from the main shaft 108. The actuation of the clutch arrangement 210 at step 258 occurs in concert with the transmission 36 having reached that lowest transmission shift mode in which the transmission 36 will operate to address the pile-crash condition. The engaging of the second shaft 206 (that is rotating in the reverse direction via driving thereof by second rotor 196) with the main shaft 108 and the disengaging of the first shaft 204 (that is rotating in the forward direction via driving thereof by first rotor 194) from the main shaft 108 causes the main shaft 108 to be driven in the reverse rotational direction. The torque output of the main shaft 108 may thus be provided to the variator 116 and summed with the torque provided by the engine shaft 96 for transferring (through the transmission 36) to the output shaft 94, according to operation of the transmission 36 in this low transmission shift mode.

After completion of step 258, the method 242 may loop back to step 246 and continue to monitor for external loads applied to the backhoe loader 10.

Accordingly, embodiments of the present disclosure provide a transmission assembly for a work vehicle that reduces inertia in the transmission assembly when shifting between different modes of operation. The transmission assembly includes an electrical machine unit having two separately and independently driveable rotors therein, along with a clutch that selectively couples the rotation output from the rotors to the variator in the transmission. Output torque from the rotors may be selectively coupled and decoupled from the variator via operation of the clutch to reduce reflected inertia in the transmission when shifting between different modes of operation. The rotors and the clutch of the electrical machine unit may be selectively controlled based on an identified impending shift in the transmission assembly, whether that transmission shift be to shift between different operating speeds or directions during normal vehicle operation or to downshift in response to a pile-crash condition of the vehicle.

Enumerated Examples

The following examples are provided, which are numbered for ease of reference.

1. A transmission assembly for a work vehicle having an engine includes a variator operably connected to the engine, a gear arrangement configured to provide a selective gear reduction for transmission of output power from the variator to an output shaft, and an electrical machine unit. The electrical machine unit further includes a main shaft operably connected to the variator, a first rotor configured to rotatably drive a first shaft, a second rotor configured to rotatably drive a second shaft, and a clutch configured to selectively couple the first shaft or the second shaft, or both the first shaft and the second shaft, to the main shaft. The clutch, the first rotor, and the second rotor are operable to control a speed and rotational direction of the main shaft in providing rotational power to the variator.

2. The transmission assembly of example 1, wherein the electrical machine unit is a split-rotor electrical machine, with the first rotor being a first rotor portion and the second rotor being a second rotor portion, and wherein the first rotor portion, the second rotor portion, and the clutch are enclosed with a common unit housing.

3. The transmission assembly of example 1, wherein the electrical machine unit includes a first electrical machine and a second electrical machine, with the first electrical machine including the first rotor and the second electrical machine including the second rotor, and wherein the first shaft and the second shaft are selectively coupled to the main shaft via the clutch and gearing.

4. The transmission assembly of example 1, further including a controller, having a processor and memory architecture, in communication with the electrical machine unit, the controller configured to control operation of the electrical machine unit to selectively and independently drive the first rotor and the second rotor in a forward rotational direction or a reverse rotational direction and control the clutch to selectively engage and disengage the first shaft and the second shaft from the main shaft.

5. The transmission assembly of claim 4, wherein the controller is configured to selectively operate the transmission assembly in a first transmission mode or a second transmission mode, control operation of the electrical machine unit to drive the first rotor and the second rotor in tandem in the forward rotational direction or the reverse rotational direction during operation of the transmission assembly in the first transmission mode or the second transmission mode, and control operation of the electrical machine unit to drive the first rotor and the second rotor in opposition, with the first rotor driven in the forward rotational direction and the second rotor driven in the reverse rotational direction, during a lead-in and shifting of the transmission assembly from the first transmission mode to the second transmission mode.

6. The transmission assembly of example 5, wherein the controller is configured to control the electrical machine unit to drive the first rotor and the second rotor, as well as the first shaft and the second shaft, in the forward rotational direction during the first transmission mode, identify an upcoming shift in the transmission assembly from the first transmission mode to the second transmission mode, cause the clutch to disengage the second shaft from the main shaft prior to shifting from the first transmission mode to the second transmission mode, control the electrical machine unit to drive the second rotor and the second shaft in the reverse rotational direction after disengaging the second shaft from the main shaft, and prior to shifting from the first transmission mode to the second transmission mode, cause the clutch to re-engage the second shaft with the main shaft and disengage the first shaft from the main shaft when shifting from the first transmission mode to the second transmission mode, thereby causing the main shaft to be driven in the reverse rotational direction, control the electrical machine unit to drive the first rotor and the first shaft in the reverse rotational direction after disengaging the first shaft from the main shaft and after shifting from the first transmission mode to the second transmission mode, and cause the clutch to re-engage the first shaft with the main shaft.

7. The transmission assembly of example 6, wherein driving the first rotor and the second rotor in opposition prior to and during shifting of the transmission assembly from the first transmission mode to the second transmission mode reduces inertia in the electrical machine unit and in the transmission assembly during the shifting.

8. The transmission assembly of example 5, wherein during operation of the transmission assembly in the first transmission mode or the second transmission mode, the controller is configured to control operation of the electrical machine unit to drive one of the first rotor or the second rotor in the forward rotational direction and idle the other of the of the first rotor or the second rotor.

9. The transmission assembly of example 4, wherein the controller is configured to monitor speed and torque parameters in the transmission assembly via a torque observer program, identify a pile-up condition based on the monitored speed and torque parameters, determine an upcoming downshift of the transmission assembly necessary to address the pile-up condition, and control the clutch to selectively disengage the first shaft or the second shaft, or both the first shaft and the second shaft, from the main shaft prior to the downshift of the transmission assembly.

10. A work vehicle includes an engine and a transmission assembly, with the transmission assembly further including a variator operably connected to the engine, a gear arrangement configured to provide a selective gear reduction for transmission of output power from the variator to an output shaft, and an electrical machine unit. The electrical machine unit further includes a main shaft operably connected to the variator, a first rotor configured to rotatably drive a first shaft, a second rotor configured to rotatably drive a second shaft, and a clutch configured to selectively couple the first shaft or the second shaft, or both the first shaft and the second shaft, to the main shaft. The clutch, the first rotor, and the second rotor are operable to control a speed and rotational direction of the main shaft in providing rotational power to the variator.

11. The work vehicle of example 10, further including a controller, having a processor and memory architecture, in communication with the electrical machine unit, the controller configured to control operation of the electrical machine unit based on a current transmission operating mode or based on an impending shift from the current transmission operating mode, wherein in controlling operation of the electrical machine unit the controller is further configured to control the electrical machine unit to selectively and independently drive the first rotor and the second rotor in a forward rotational direction or a reverse rotational direction and control the clutch to selectively engage or disengage the first shaft and the second shaft from the main shaft, to control rotation thereof in the forward rotational direction or the reverse rotational direction.

12. The work vehicle of example 11, wherein the controller configured to selectively operate the transmission assembly in a first transmission mode or a second transmission mode, control operation of the electrical machine unit to drive the first rotor and the second rotor in tandem in the forward rotational direction or the reverse rotational direction during operation of the transmission assembly in the first transmission mode or the second transmission mode, and control operation of the electrical machine unit to drive the first rotor and the second rotor in opposition, with the first rotor driven in the forward rotational direction and the second rotor driven in the reverse rotational direction, during a lead-in and shifting of the transmission assembly from the first transmission mode to the second transmission mode.

13. The work vehicle of example 12, wherein the controller is configured to control the electrical machine unit to drive the first rotor and the second rotor, as well as the first shaft and the second shaft, in the forward rotational direction during the first transmission mode, identify an upcoming shift in the transmission assembly from the first transmission mode to the second transmission mode, cause the clutch to disengage the second shaft from the main shaft prior to shifting from the first transmission mode to the second transmission mode, control the electrical machine unit to drive the second rotor and the second shaft in the reverse rotational direction after disengaging the second shaft from the main shaft, and prior to shifting from the first transmission mode to the second transmission mode, cause the clutch to re-engage the second shaft with the main shaft and disengage the first shaft from the main shaft when shifting from the first transmission mode to the second transmission mode, thereby causing the main shaft to be driven in the reverse rotational direction, control the electrical machine unit to drive the first rotor and the first shaft in the reverse rotational direction after disengaging the first shaft from the main shaft and after shifting from the first transmission mode to the second transmission mode, and cause the clutch to re-engage the first shaft with the main shaft.

14. The work vehicle of example 12, wherein the controller is configured to control operation of the electrical machine unit to drive one of the first rotor or the second rotor in the forward rotational direction and idle the other of the of the first rotor or the second rotor, during operation of the transmission assembly in the first transmission mode or the second transmission mode.

15. The work vehicle of example 11, wherein the controller is configured to monitor speed and torque parameters in the transmission assembly via a torque observer program, identify a pile-up condition based on the monitored speed and torque parameters, determine an upcoming downshift of the transmission assembly necessary to address the pile-up condition, and control the clutch to selectively disengage the first shaft or the second shaft, or both the first shaft and the second shaft, from the main shaft prior to the downshift of the transmission assembly.

CONCLUSION

The foregoing has thus provided a transmission assembly for a work vehicle that reduces inertia in the transmission assembly when shifting between different modes of operation. The transmission assembly includes an electrical machine unit having two separately and independently driveable rotors therein, along with a clutch that selectively couples the rotation output from the rotors to the variator in the transmission. Output torque from the rotors may be selectively coupled and decoupled from the variator via operation of the clutch to reduce reflected inertia in the transmission when shifting between different modes of operation. The rotors and the clutch of the electrical machine unit may be selectively controlled based on an identified impending shift in the transmission assembly, whether that transmission shift be to shift between different operating speeds or directions during normal vehicle operation or to downshift in response to a pile-crash condition of the vehicle.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C). Also, the use of "one or more of" or "at least one of" in the claims for certain elements does not imply other elements are singular nor has any other effect on the other claim elements.

Finally, as used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A transmission assembly for a work vehicle having an engine, the transmission assembly comprising:
   a variator operably connected to the engine;
   a gear arrangement configured to provide a selective gear reduction for transmission of output power from the variator to an output shaft;
   an electrical machine unit including:
      a main shaft operably connected to the variator;
      a first rotor configured to rotatably drive a first shaft;
      a second rotor configured to rotatably drive a second shaft; and
      a clutch configured to selectively couple the first shaft or the second shaft, or both the first shaft and the second shaft, to the main shaft;
      wherein the clutch, the first rotor, and the second rotor are operable to control a speed and rotational direction of the main shaft in providing rotational power to the variator; and
   a controller, including a processor and memory architecture, in communication with the electrical machine unit, the controller configured to:
      control operation of the electrical machine unit to selectively and independently drive the first rotor and the second rotor in a forward rotational direction or a reverse rotational direction;
      control the clutch to selectively engage and disengage the first shaft and the second shaft from the main shaft;
      selectively operate the transmission assembly in a first transmission mode or a second transmission mode;
      control operation of the electrical machine unit to drive the first rotor and the second rotor in tandem in the forward rotational direction or the reverse rotational direction during operation of the transmission assembly in the first transmission mode or the second transmission mode; and
      control operation of the electrical machine unit to drive the first rotor and the second rotor in opposition, with the first rotor driven in the forward rotational direction and the second rotor driven in the reverse rotational direction, during a lead-in and shifting of the transmission assembly from the first transmission mode to the second transmission mode.

2. The transmission assembly of claim 1, wherein the electrical machine unit comprises a split-rotor electrical machine, with the first rotor comprising a first rotor portion and the second rotor comprising a second rotor portion, and wherein the first rotor portion, the second rotor portion, and the clutch are enclosed with a common unit housing.

3. The transmission assembly of claim 2, wherein the split-rotor electrical machine comprises either a single stator that interacts with each of the first rotor portion and the second rotor portion or a first stator and a second stator that interact with the first rotor portion and the second rotor portion, respectively.

4. The transmission assembly of claim 1, wherein the electrical machine unit comprises a first electrical machine and a second electrical machine, with the first electrical machine including the first rotor and the second electrical machine including the second rotor, and wherein the first shaft and the second shaft are selectively coupled to the main shaft via the clutch.

5. The transmission assembly of claim 1, wherein the controller is configured to:
   control the electrical machine unit to drive the first rotor and the second rotor, as well as the first shaft and the second shaft, in the forward rotational direction during the first transmission mode;
   identify an upcoming shift in the transmission assembly from the first transmission mode to the second transmission mode;
   cause the clutch to disengage the second shaft from the main shaft prior to shifting from the first transmission mode to the second transmission mode;
   after disengaging the second shaft from the main shaft, and prior to shifting from the first transmission mode to the second transmission mode, control the electrical machine unit to drive the second rotor and the second shaft in the reverse rotational direction;
   cause the clutch to re-engage the second shaft with the main shaft and disengage the first shaft from the main shaft when shifting from the first transmission mode to the second transmission mode, thereby causing the main shaft to be driven in the reverse rotational direction;
   after disengaging the first shaft from the main shaft, and after shifting from the first transmission mode to the second transmission mode, control the electrical machine unit to drive the first rotor and the first shaft in the reverse rotational direction; and cause the clutch to re-engage the first shaft with the main shaft.

6. The transmission assembly of claim 5, wherein driving the first rotor and the second rotor in opposition prior to and during shifting of the transmission assembly from the first transmission mode to the second transmission mode reduces inertia in the electrical machine unit and in the transmission assembly during the shifting.

7. The transmission assembly of claim 1, wherein during operation of the transmission assembly in the first transmission mode or the second transmission mode, the controller is configured to control operation of the electrical machine unit to drive one of the first rotor or the second rotor in the forward rotational direction and idle the other of the first rotor or the second rotor.

8. A transmission assembly for a work vehicle having an engine, the transmission assembly comprising:
   a variator operably connected to the engine;
   a gear arrangement configured to provide a selective gear reduction for transmission of output power from the variator to an output shaft;
   an electrical machine unit including:
      a main shaft operably connected to the variator;
      a first rotor configured to rotatably drive a first shaft;
      a second rotor configured to rotatably drive a second shaft; and
      a clutch configured to selectively couple the first shaft or the second shaft, or both the first shaft and the second shaft, to the main shaft;
      wherein the clutch, the first rotor, and the second rotor are operable to control a speed and rotational direction of the main shaft in providing rotational power to the variator; and
   a controller, including a processor and memory architecture, in communication with the electrical machine unit, the controller configured to:
      control operation of the electrical machine unit to selectively and independently drive the first rotor and the second rotor in a forward rotational direction or a reverse rotational direction;
      control the clutch to selectively engage and disengage the first shaft and the second shaft from the main shaft;
      monitor speed and torque parameters in the transmission assembly via a torque observer program;
      identify a pile-up condition based on the monitored speed and torque parameters;
      determine an upcoming downshift of the transmission assembly necessary to address the pile-up condition; and
      control the clutch to selectively disengage the first shaft or the second shaft, or both the first shaft and the second shaft, from the main shaft prior to the downshift of the transmission assembly.

9. The transmission assembly of claim 1, further comprising a third electrical machine coupled to the engine shaft to receive power therefrom and configured to generate an output electrical power that is provided to the electrical machine unit.

10. A work vehicle comprising:
    an engine; and
    a transmission assembly comprising:
       a variator operably connected to the engine;
       a gear arrangement configured to provide a selective gear reduction for transmission of output power from the variator to an output shaft;
       an electrical machine unit including:
          a main shaft operably connected to the variator;
          a first rotor configured to rotatably drive a first shaft;
          a second rotor configured to rotatably drive a second shaft; and
          a clutch configured to selectively couple the first shaft or the second shaft, or both the first shaft and the second shaft, to the main shaft;
          wherein the clutch, the first rotor and the second rotor are operable to control a speed and rotational direction of the main shaft in providing rotational power to the variator; and
       a controller, including a processor and memory architecture, in communication with the electrical machine unit and the transmission assembly, the controller configured to control operation of the electrical machine unit based on a current transmission operating mode or based on an impending shift from the current transmission operating mode;
       wherein, in controlling operation of the electrical machine unit, the controller is further configured to:
          control the electrical machine unit to selectively and independently drive the first rotor and the second rotor in a forward rotational direction or a reverse rotational direction;
          control the clutch to selectively engage or disengage the first shaft and the second shaft from the main shaft to control rotation thereof in the forward rotational direction or the reverse rotational direction;
          selectively operate the transmission assembly in a first transmission mode or a second transmission mode;
          control operation of the electrical machine unit to drive the first rotor and the second rotor in tandem in the forward rotational direction or the reverse rotational direction during operation of the transmission assembly in the first transmission mode or the second transmission mode; and
          control operation of the electrical machine unit to drive the first rotor and the second rotor in opposition, with the first rotor driven in the forward rotational direction and the second rotor driven in the reverse rotational direction, during a lead-in and shifting of the transmission assembly from the first transmission mode to the second transmission mode.

11. The work vehicle of claim 10, wherein the controller is configured to:
    control the electrical machine unit to drive the first rotor and the second rotor, as well as the first shaft and the second shaft, in the forward rotational direction during the first transmission mode;
    identify an upcoming shift in the transmission assembly from the first transmission mode to the second transmission mode;
    cause the clutch to disengage the second shaft from the main shaft prior to shifting from the first transmission mode to the second transmission mode;
    after disengaging the second shaft from the main shaft, and prior to shifting from the first transmission mode to the second transmission mode, control the electrical machine unit to drive the second rotor and the second shaft in the reverse rotational direction;
    cause the clutch to re-engage the second shaft with the main shaft and disengage the first shaft from the main shaft when shifting from the first transmission mode to the second transmission mode, thereby causing the main shaft to be driven in the reverse rotational direction;

after disengaging the first shaft from the main shaft, and after shifting from the first transmission mode to the second transmission mode, control the electrical machine unit to drive the first rotor and the first shaft in the reverse rotational direction; and cause the clutch to re-engage the first shaft with the main shaft.

12. The work vehicle of claim 10, wherein the controller is configured to control operation of the electrical machine unit to drive one of the first rotor or the second rotor in the forward rotational direction and idle the other of the of first rotor or the second rotor, during operation of the transmission assembly in the first transmission mode or the second transmission mode.

13. A work vehicle comprising:
an engine; and
a transmission assembly comprising:
 a variator operably connected to the engine;
 a gear arrangement configured to provide a selective gear reduction for transmission of output power from the variator to an output shaft;
 an electrical machine unit including:
  a main shaft operably connected to the variator;
  a first rotor configured to rotatably drive a first shaft;
  a second rotor configured to rotatably drive a second shaft; and
  a clutch configured to selectively couple the first shaft or the second shaft, or both the first shaft and the second shaft, to the main shaft;
  wherein the clutch, the first rotor and the second rotor are operable to control a speed and rotational direction of the main shaft in providing rotational power to the variator; and
 a controller, including a processor and memory architecture, in communication with the electrical machine unit and the transmission assembly, the controller configured to control operation of the electrical machine unit based on a current transmission operating mode or based on an impending shift from the current transmission operating mode;

wherein, in controlling operation of the electrical machine unit, the controller is further configured to:
 control the electrical machine unit to selectively and independently drive the first rotor and the second rotor in a forward rotational direction or a reverse rotational direction;
 control the clutch to selectively engage or disengage the first shaft and the second shaft from the main shaft, to control rotation thereof in the forward rotational direction or the reverse rotational direction;
 monitor speed and torque parameters in the transmission assembly via a torque observer program;
 identify a pile-up condition based on the monitored speed and torque parameters;
 determine an upcoming downshift of the transmission assembly necessary to address the pile-up condition; and
 control the clutch to selectively disengage the first shaft or the second shaft, or both the first shaft and the second shaft, from the main shaft prior to the downshift of the transmission assembly.

14. The work vehicle of claim 10, further comprising a third electrical machine coupled to the engine to receive rotational power therefrom and configured to generate an output electrical power that is provided to the electrical machine unit.

15. The work vehicle of claim 10, wherein the electrical machine unit comprises a split-rotor electrical machine, with the first rotor comprising a first rotor portion and the second rotor comprising a second rotor portion, and wherein the first rotor portion, the second rotor portion, and the clutch are enclosed with a common unit housing.

16. The work vehicle of claim 10, wherein the electrical machine unit comprises a first electrical machine and a second electrical machine, with the first electrical machine including the first rotor and the second electrical machine including the second rotor, and wherein the first shaft and the second shaft are selectively coupled to the main shaft via the clutch.

* * * * *

UNITED STATES PATENT AND TRADEMARK OFFICE
CERTIFICATE OF CORRECTION

| | |
|---|---|
| PATENT NO. | : 11,820,361 B2 |
| APPLICATION NO. | : 17/538691 |
| DATED | : November 21, 2023 |
| INVENTOR(S) | : David S. Black et al. |

It is certified that error appears in the above-identified patent and that said Letters Patent is hereby corrected as shown below:

On the Title Page

On Page 2, in Item (56), under "U.S. PATENT DOCUMENTS", Line 69, for ref '2014/0315685', delete "Hotter" and insert -- Hofler, --, therefor.

On Page 4, in Item (56), under "OTHER PUBLICATIONS", Line 19, delete "DE102022210864.7" and insert -- DE102022210867.1, --, therefor.

Signed and Sealed this
Twenty-third Day of January, 2024

Katherine Kelly Vidal
*Director of the United States Patent and Trademark Office*